(12) United States Patent
Lilley

(10) Patent No.: US 11,925,238 B2
(45) Date of Patent: Mar. 12, 2024

(54) ITEM OF FOOTWEAR

(71) Applicant: FITFLOP LIMITED, London (GB)

(72) Inventor: Kim Lilley, London (GB)

(73) Assignee: FITFLOP LIMITED (GB)

( * ) Notice: Subject to any disclaimer, the term of this patent is extended or adjusted under 35 U.S.C. 154(b) by 451 days.

(21) Appl. No.: 16/338,737

(22) PCT Filed: Oct. 5, 2017

(86) PCT No.: PCT/GB2017/000148
§ 371 (c)(1),
(2) Date: Apr. 2, 2019

(87) PCT Pub. No.: WO2018/065746
PCT Pub. Date: Apr. 12, 2018

(65) Prior Publication Data
US 2021/0267303 A1    Sep. 2, 2021

(30) Foreign Application Priority Data
Oct. 7, 2016 (GB) .................................. 1617082

(51) Int. Cl.
*A43B 7/16* (2006.01)
*A43B 3/00* (2022.01)
(Continued)

(52) U.S. Cl.
CPC .............. *A43B 7/16* (2013.01); *A43B 3/0078* (2013.01); *A43B 7/1425* (2013.01); *A43B 13/04* (2013.01); *A43B 13/186* (2013.01); *A43B 13/188* (2013.01); *A43B 21/26* (2013.01); *A43B 21/32* (2013.01); *B29D 35/122* (2013.01)

(58) Field of Classification Search
CPC ........... A43B 7/16; A43B 7/144; A43B 7/149; A43B 21/32
See application file for complete search history.

(56) References Cited

U.S. PATENT DOCUMENTS

| 1,676,355 A | 7/1928 | Perry |
| 1,711,302 A * | 4/1929 | Belpedio ................ A43B 21/26 |
| | | 36/35 B |

(Continued)

FOREIGN PATENT DOCUMENTS

| CN | 102302235 B | 1/2012 |
| CN | 104672719 A | 6/2015 |

(Continued)

*Primary Examiner* — Jila M Mohandesi
(74) *Attorney, Agent, or Firm* — Luedeka Neely, P.C.

(57) ABSTRACT

The present invention provides an item of footwear. It is desired to provide an item of footwear (100) which provides an attractive appearance whilst maintaining the comfort of the user. It is particularly advantageous to deliver a thinner item of footwear (100), which still maintains the comfort of a thicker item. An item of footwear (100) comprises a securing means for securing the item of footwear (100) to a foot of a user; and a sole for engaging a foot of a user in use, the sole having a heel region (20) for supporting the heel of a wearer in use and a forward region (30) for supporting the forefoot of a wearer in use, wherein: the sole (1) has a raised protrusion (22) forming the upper surface (2) in a first portion of the heel region (20).

19 Claims, 7 Drawing Sheets

(51) Int. Cl.
*A43B 7/14* (2022.01)
*A43B 7/1425* (2022.01)
*A43B 13/04* (2006.01)
*A43B 13/18* (2006.01)
*A43B 21/26* (2006.01)
*A43B 21/32* (2006.01)
*B29D 35/12* (2010.01)

(56) References Cited

U.S. PATENT DOCUMENTS

| | | | | |
|---|---|---|---|---|
| 2,464,251 A | * | 3/1949 | Moody | A43B 21/26 36/35 B |
| 2,856,771 A | * | 10/1958 | Anderson | A43B 17/02 462/1 |
| 3,922,801 A | * | 12/1975 | Zente | A43B 13/20 36/44 |
| 4,084,333 A | | 4/1978 | Vecchio | |
| 4,223,457 A | * | 9/1980 | Borgeas | A43B 13/189 36/35 B |
| 4,446,633 A | | 5/1984 | Scheinhaus et al. | |
| 4,760,655 A | * | 8/1988 | Mauch | A43B 7/1425 36/141 |
| 5,175,946 A | * | 1/1993 | Tsai | A43B 17/03 36/35 B |
| 5,195,257 A | | 3/1993 | Holcomb et al. | |
| 5,322,056 A | * | 6/1994 | Menghi | A43B 7/146 601/134 |
| 5,784,811 A | * | 7/1998 | Mauch | A43B 7/1425 36/43 |
| 5,864,969 A | * | 2/1999 | Mauch | A43B 1/0054 36/43 |
| 5,975,861 A | | 11/1999 | Shin et al. | |
| 6,050,001 A | * | 4/2000 | Ditrtrich | A43B 7/148 36/31 |
| 6,098,313 A | * | 8/2000 | Skaja | A43B 13/181 36/28 |
| 7,392,604 B2 | * | 7/2008 | Greene | A43B 7/144 36/97 |
| 7,980,008 B2 | | 7/2011 | Song | |
| D659,966 S | * | 5/2012 | Lo | A43B 7/144 D2/954 |
| 9,015,961 B2 | | 4/2015 | Graziani et al. | |
| 2002/0050077 A1 | * | 5/2002 | Wang | A43B 5/00 36/28 |
| 2005/0148727 A1 | | 7/2005 | Ajbani et al. | |
| 2005/0166425 A1 | * | 8/2005 | Seiter | A43B 7/22 36/44 |
| 2006/0283046 A1 | * | 12/2006 | Mason | A43B 13/186 36/35 R |
| 2008/0289218 A1 | * | 11/2008 | Nakano | A43B 13/186 36/43 |
| 2009/0038179 A1 | * | 2/2009 | Chen | A43B 7/146 36/41 |
| 2009/0229143 A1 | | 9/2009 | Meschan | |
| 2011/0314699 A1 | | 12/2011 | Byrne | |
| 2012/0144697 A1 | * | 6/2012 | Everz Vaz | A61F 5/14 36/44 |
| 2012/0198729 A1 | | 8/2012 | Graziani et al. | |
| 2013/0185955 A1 | * | 7/2013 | Cheng | A43B 7/144 36/28 |
| 2015/0141539 A1 | | 5/2015 | Lee | |
| 2015/0223563 A1 | | 8/2015 | Liebeno et al. | |
| 2016/0160037 A1 | | 6/2016 | Hanna et al. | |

FOREIGN PATENT DOCUMENTS

| | | |
|---|---|---|
| CN | 104893110 B | 9/2015 |
| CN | 105949604 B | 1/2018 |
| EP | 1872924 A1 | 1/2008 |
| JP | 2003292667 A | 10/2003 |
| JP | 2007302768 A | 11/2007 |
| JP | 2008067953 A | 3/2008 |
| KR | 20130126877 A | 11/2013 |
| KR | 20160014487 A | 2/2016 |
| KR | 101709736 B1 | 2/2017 |

* cited by examiner

Section A1 - A2

Section A1 - A2

Section H1 - H2

Section A1 - A2

Section C1 - C2

ITEM OF FOOTWEAR

The present invention provides an item of footwear. It is desired to provide an item of footwear which provides an attractive appearance whilst maintaining the comfort of the user. It is particularly advantageous to deliver a thinner item of footwear, which still maintains the comfort of a thicker item.

According to the present invention, an item of footwear is provided according to claim 1.

An alternative embodiment of an item of footwear according to the present invention is provided in claim 8.

A method of manufacturing a sole for an item of footwear according to the present invention is provided according to claim 12.

A further alternative embodiment of an item of footwear according to the present invention is provided wherein the sole is formed of a midsole material that is selected from a synthetic rubber, and an olefin block copolymer, wherein the midsole material has an expansion rate of from 1.55 to 1.65.

The invention will now be described in detail, by way of example only, with reference to the accompanying drawings in which.

Figure 1:
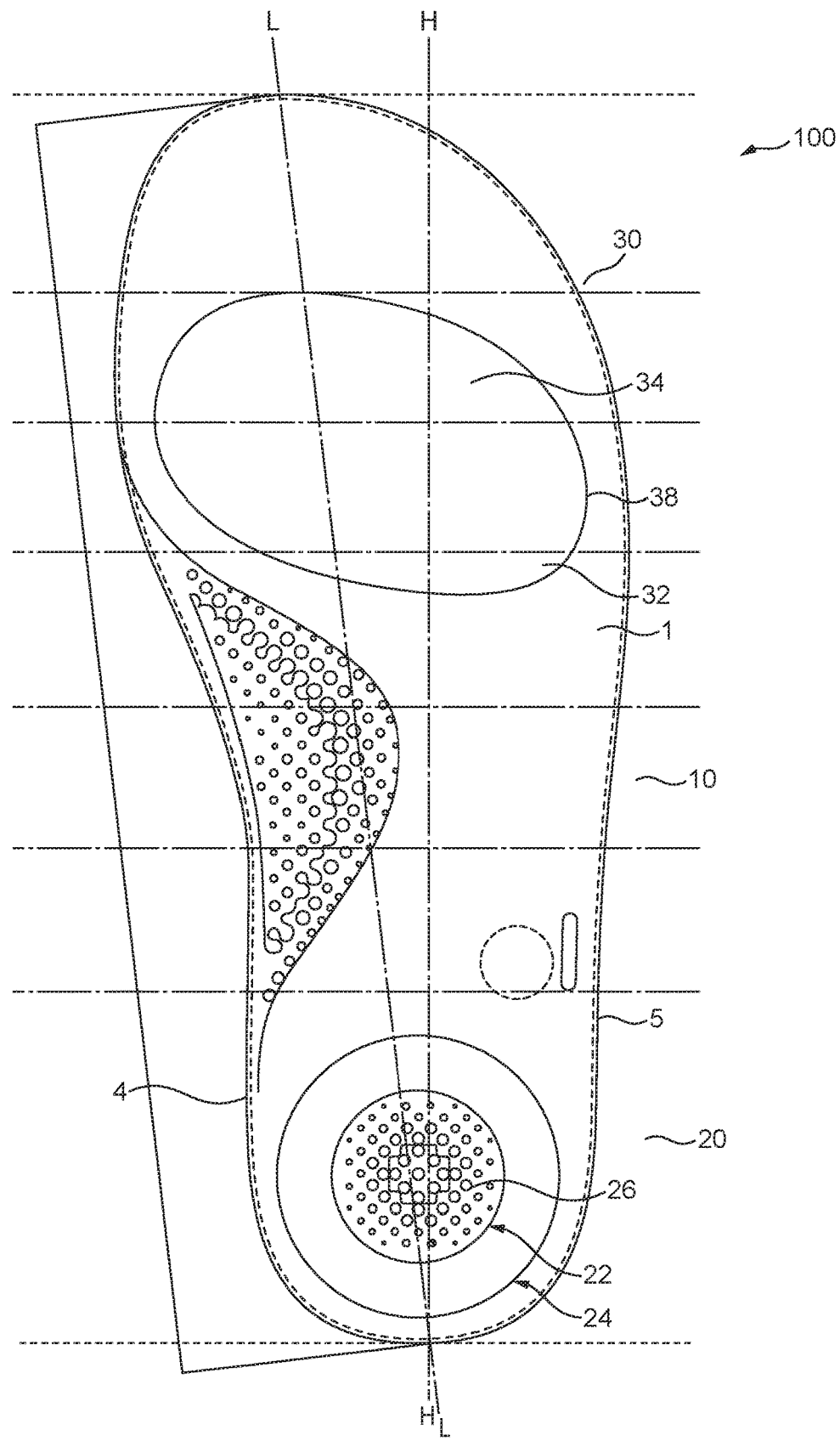
FIG. 1 is a top view of an embodiment of an item of footwear according to the present invention.

An embodiment of the present invention is shown in the item of footwear 100 depicted in FIGS. 1 to 6. The item of footwear 100 comprises a sole 1 for engaging with the foot of a user when in use. The item of footwear further comprises a securing means for securing the item of footwear to the foot of the user. The securing means may be a conventional upper (i.e. of a closed shoe) or may be in the form of straps, laces, buckles or any other securing means as known in the art.

The sole 1 comprises a heel region 20 for supporting the heel of a wearer in use and a forward region 30 for supporting the forefoot of a wearer in use. Optionally, a middle region 10 may be provided between the heel region 20 and the forward region 30. Alternatively, the heel region 20 and the forward region 30 may meet one another without an intermediate region. In preferred embodiments, the forward region 30 may comprise from 40% to 60% (preferably 50%) of the frontal region of the sole 1 with respect to the longitudinal direction defined below.

Figure 2:
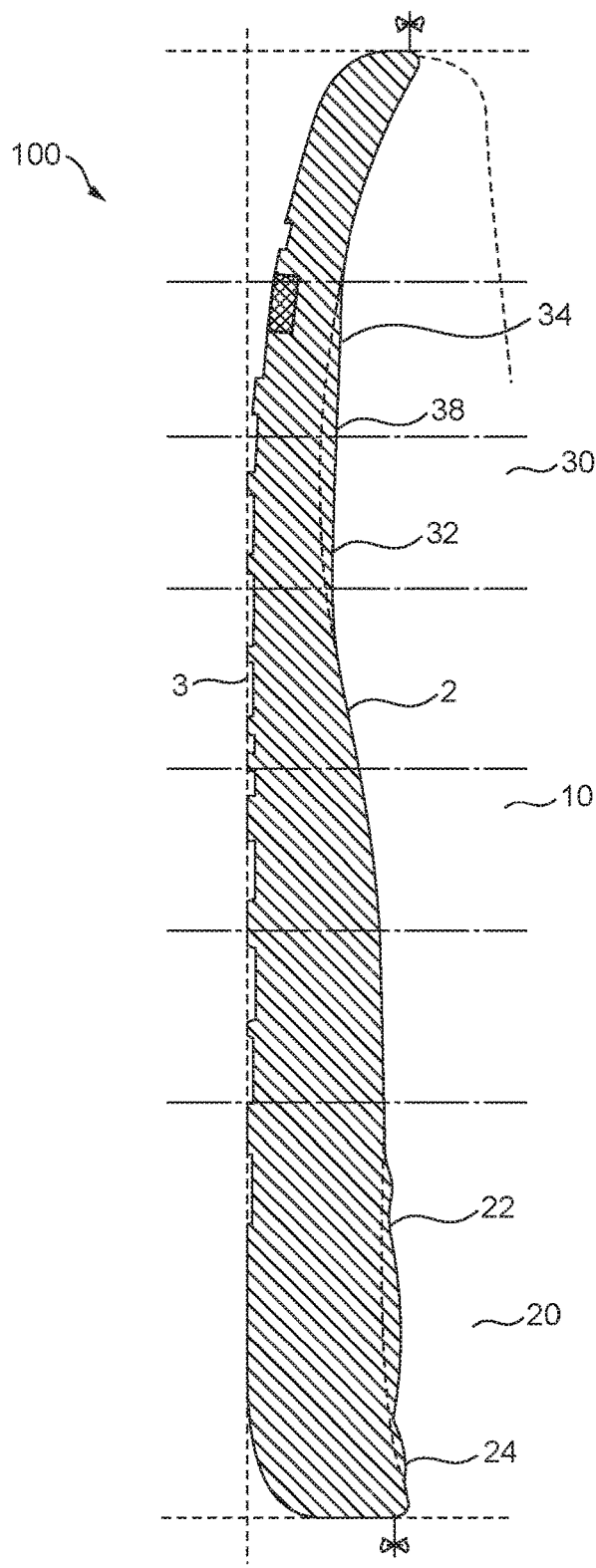
FIG. 2 is a longitudinal view of the embodiment of FIG. 1.

As shown in FIG. 2, the sole 1 comprises two major surfaces, an upper surface 2 and a lower surface 3. In preferred embodiments, in use the upper surface 2 contacts the foot of a user and the lower surface 3 contacts the ground. The sole thickness may be measured in a direction perpendicular to one of the upper or lower surfaces 2, 3. The major surfaces extend between first and second lateral edges 4, 5. A longitudinal direction is defined as the direction from the heel region 20 to the forward region 30. Preferably, the longitudinal direction extends along the longest dimension L-L of the sole 1. A lateral direction is defined perpendicular to the longitudinal direction.

The heel region 20 of the sole is provided with a raised protrusion 22 in a first portion of the heel region (i.e. extending from the upper surface 2). This can enhance the cushioning of the sole 1 under the user's heel in use. Preferably, the raised protrusion 22 is substantially rounded. This enhances the interaction of the user's heel and the protrusion 22 during the pronation of the foot when the sole 1 is in use. In particular, the raised protrusion 22 may be dome shaped. Typically, the protrusion 22 may extend from the upper surface 2 of the sole by a distance of 2 mm to 5 mm and preferably 3 to 4 mm. This distance is the difference between the outer perimeter of the protrusion 22 to its highest point. Preferably, the raised protrusion 22 is centred laterally and spaced from the rear end, preferably by an amount in the range 3 mm to 10 mm (preferably 6 mm).

The protrusion 22 may preferably have a width in the lateral direction in the range of 35 mm to 45 mm (i.e. the diameter of the protrusion 22 when it is a rounded protrusion).

The protrusion 22 may additionally be surrounded by an annular protrusion 24 which extends substantially around the entirety of the perimeter of the protrusion 22. Typically, the annular protrusion 24 has an outer diameter in the range of 10 mm to 20 mm. Preferably, the annular protrusion 24 extends from the upper surface 2 of the sole to the same height or by a distance less than that of the main protrusion 22. The outer perimeter of the annular protrusion 24 is spaced from the outer edges 4, 5 of the sole 1.

In certain embodiments, the raised protrusion 22 is further provided with additional surface indentations 26. These surface indentations 26 are typically in the form of circular indentations with diameters between 0.1 mm and 0.3 mm. These indentations 26 have a depth of approximately 0.3 mm from the upper surface of the raised protrusion 22.

Figure 3:
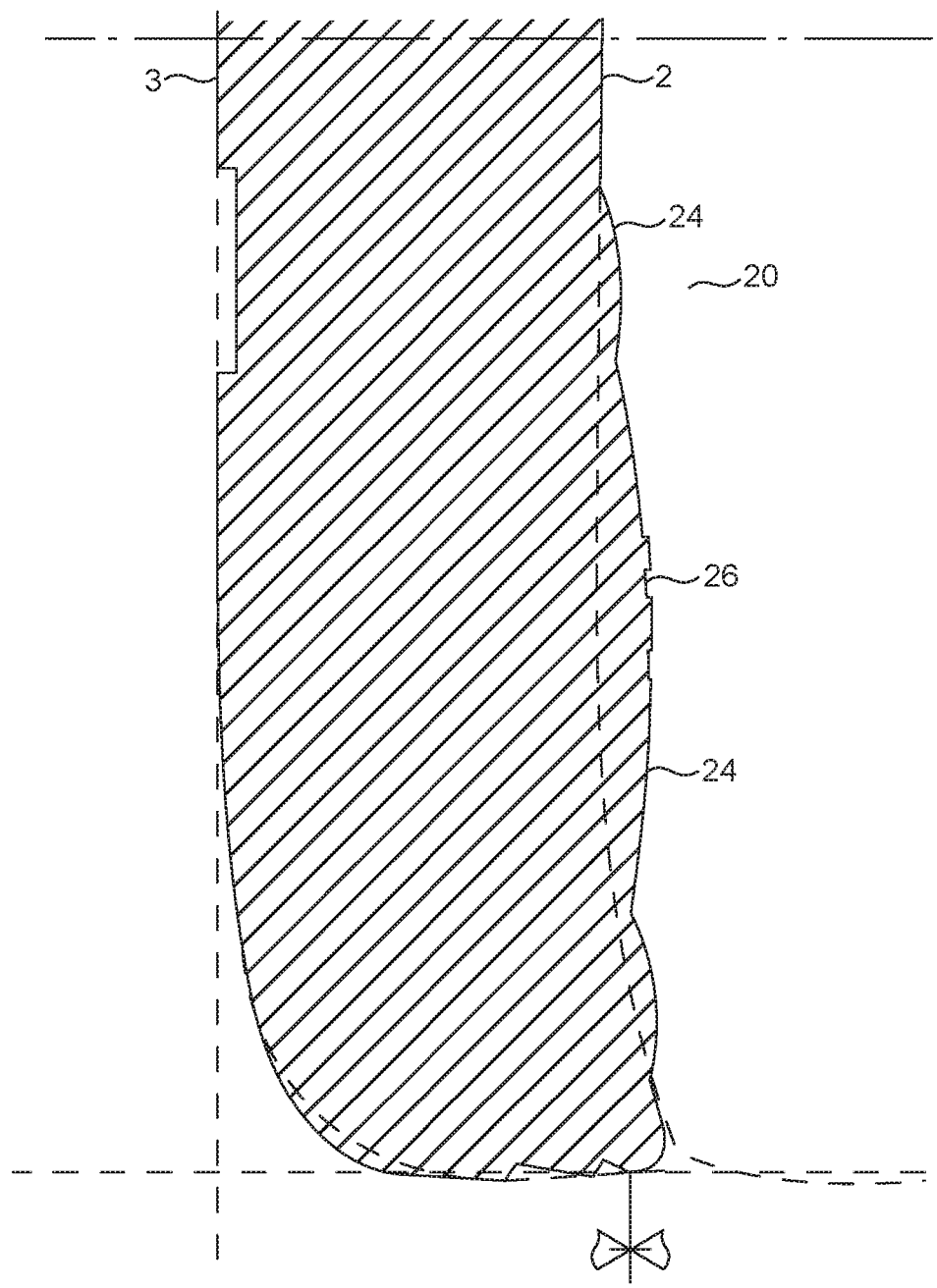
FIG. 3 is a partial section view of the embodiment of FIG. 1.
Figure 4:
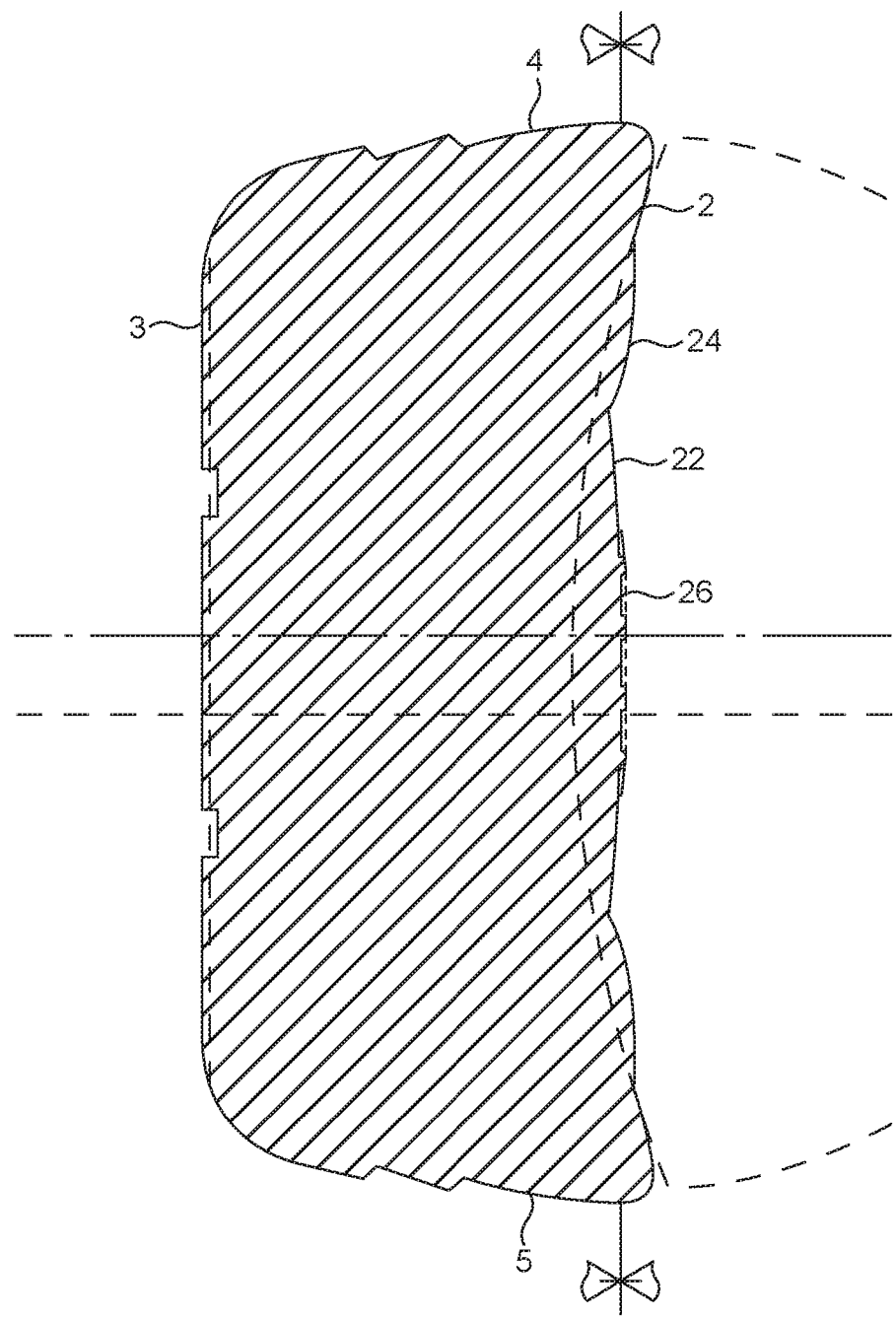
FIG. 4 is a partial section view of the embodiment of FIG. 1.

FIGS. 3 and 4 provide close up views of the heel region 20. FIG. 3 is cutaway along the length of the sole 1 along the longest direction L. FIG. 4 is cutaway along the width of the sole 1 along the lateral direction. In these Figures, the raised and annular protrusions 22, 24 can be clearly seen. The edges of the sole either side of the protrusions 22, 24 have a greater thickness than the total thickness from the lower surface 3 to the highest point of the protrusions 22, 24.

With reference to FIG. 2, the thickness of the sole 1 along the first and second lateral edges 4, 5 tapers in the longitudinal direction so as to reduce in thickness within the forward region 30 from the front of the heel region 20 towards the forward end of the sole 1. However, the lateral edges 4, 5 do not necessary taper throughout the whole of the forward region. Preferably, there may be a tip portion in which the first and second lateral edges 4, do not taper. The tip portion may be the forewardmost 10% to 15% of the sole 1

In the forward region 30 between the tapering portions of the first and second lateral edges 4, 5 a first central region 32 is defined. In the first central region 32 the thickness of the sole is maintained or increased in the longitudinal direction from the heel region 20 to the forward region 30. Preferably, in the first central region 32 the thickness of the sole 1 tapers so as to increase in the longitudinal direction from the heel region 20 to the forward region 30.

The first central region 32 is arranged to support some or all of the ball of the wearer's foot. It is therefore possible to provide an aesthetically pleasing appearance of a narrow tapering shoe in side view, whilst not tapering below the ball of the wearer's foot, thereby providing localised support.

Figure 7:
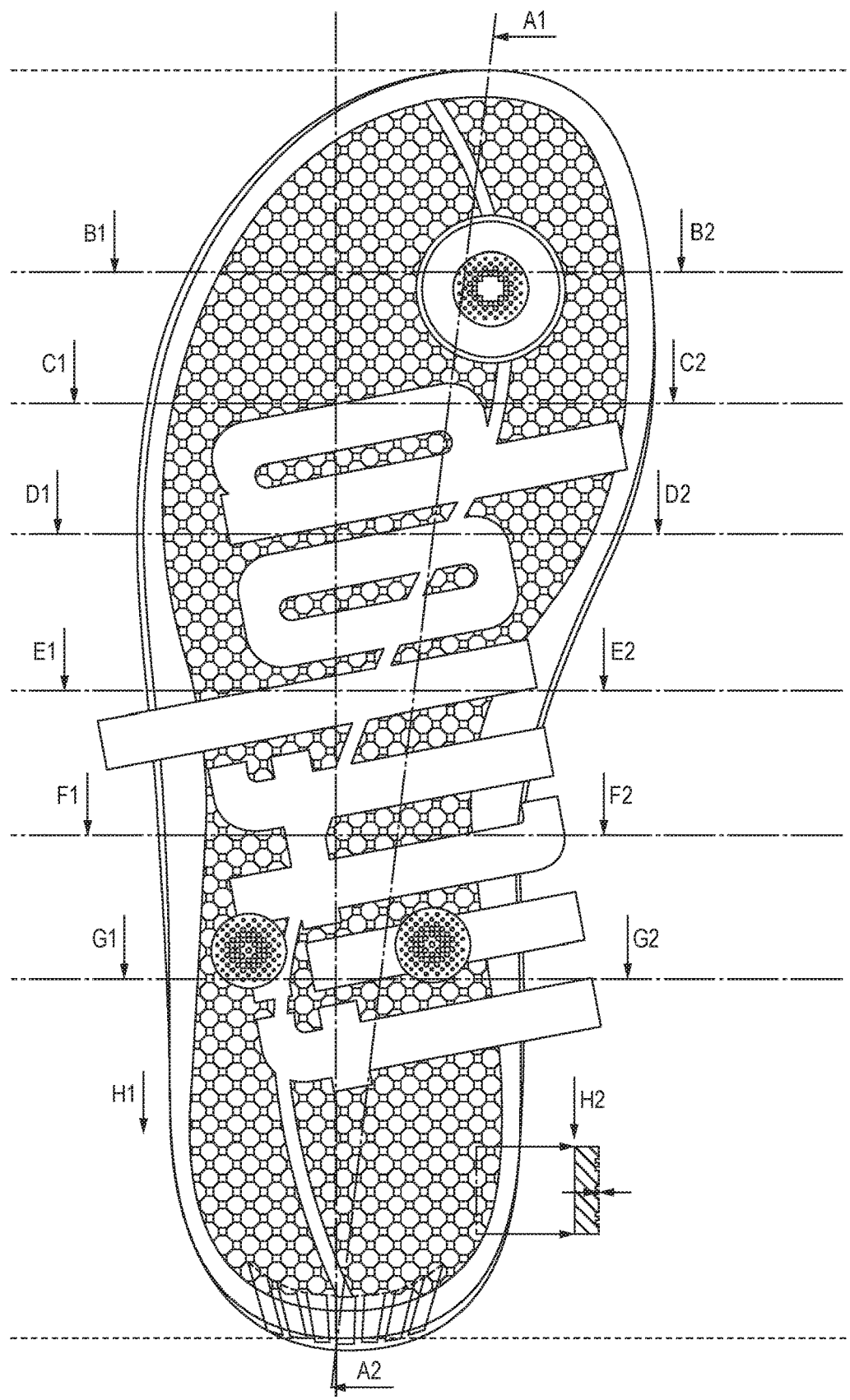
FIG. 7 is a bottom view of the embodiment of FIG. 1.

In preferred embodiments, in the forward region between the first and second lateral edges 4, 5 a second central region 34 is defined. The second central region 34 may be further from the heel region 20 than the first central region 32. As shown in FIG. 7, the first and second central regions 32, 34 may be adjacent one another to form a single continuous region 38 that is aligned with the ball of the foot in use. In the second forward region 34, the thickness of the sole 1 tapers so as to reduce in the longitudinal direction from the heel region 20 to the frontal region 30.

Therefore the region 38 can provide a thicker region of sole 1 below the ball of the wearer's foot in use than would be provided by a normal tapered sole.

Figure 5:
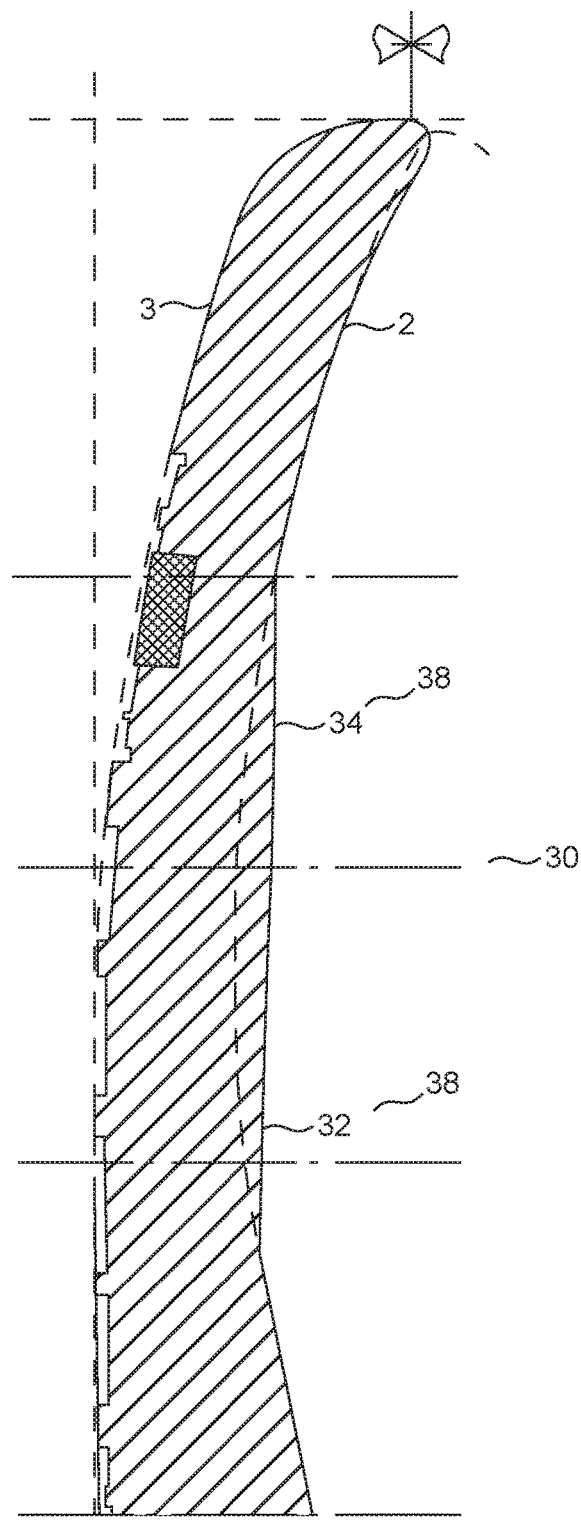
FIG. 5 is a partial section view of the embodiment of FIG. 1.
Figure 6:
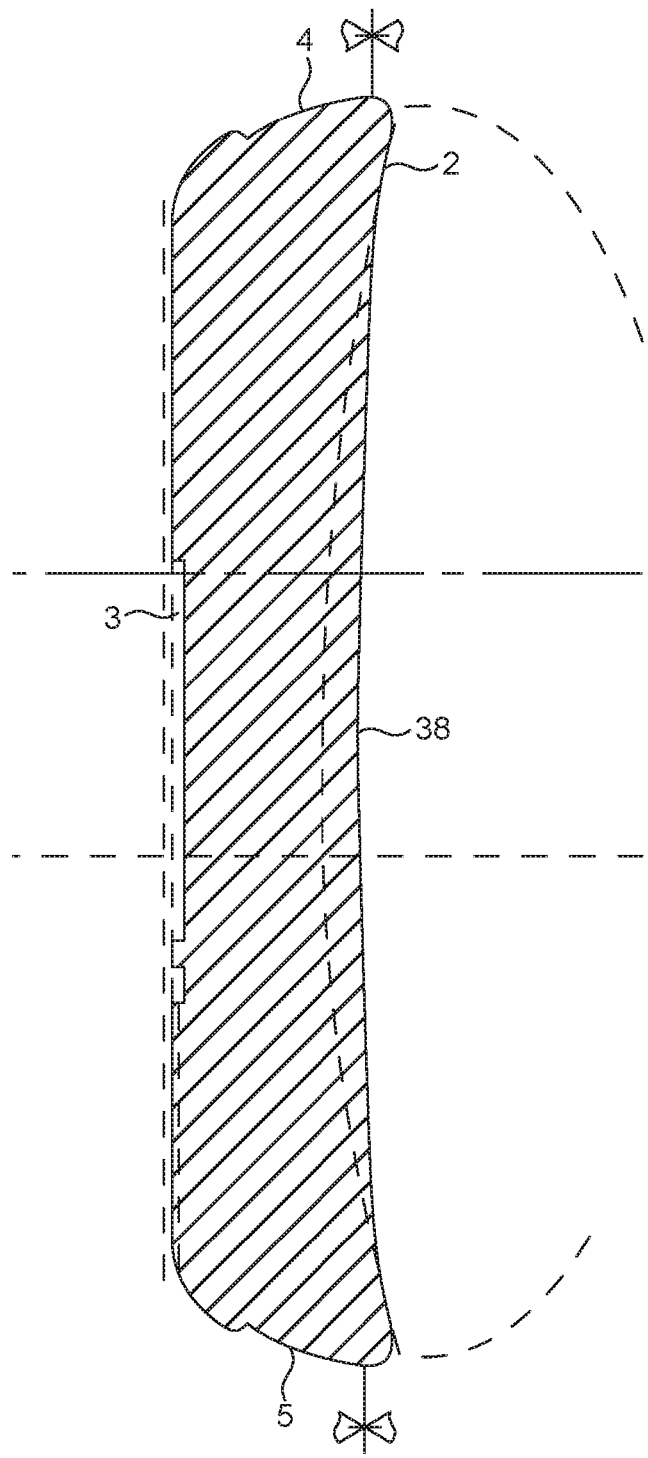
FIG. 6 is a partial section view of the embodiment of FIG. 1.

FIGS. 5 and 6 provide close up views of the forward region 30. FIG. 5 is cutaway along the longest direction L of the sole 1. FIG. 6 is cutaway along the width of the sole 1 in the lateral direction. These views show the shape of the first and second central regions 32, 34 as described above.

By providing the protrusions 22, 24 in the heel region 20 and the central region 32, the overall thickness of the sole may be decreased whilst still maintaining comfort and structure. In this manner, items of footwear with thinner soles can be produced which are still comfortable and durable. Preferably, the thickness of the thickest point is below 30 mm. It has been found that the sole as described herein can provide a comfortable experience even when the thickness of the thickest point is below 30 mm. This allows greater design flexibility with suitably enhanced strength and comfort. Such a sole may be formed of ethylene-vinyl acetate (EVA) or an alternative material (such as that defined below).

A method of manufacturing a sole 1 for such an item of footwear will now be described. Preferably, the sole 1 is a midsole, but the present invention is equally applicable to other sole layers. A mould for shaping the sole 1 is provided. This mould is provided with corresponding shaped sections to provide a sole 1 with the shape and protrusions 22, 24, 26, 32 as described above.

A material for the sole 1 is provided which comprises a thermoplastic elastomer suitable for use in the moulding process. The sole material may be formed with an expansion ratio, which is the ratio between the volumes of the material when in liquid form and when in expanded solidified form. In particular, for the present invention the sole material should have an expansion ratio of from 1.55 to 1.65. In preferred embodiments, the expansion ratio should be 1.6. Expansion ratios in these ranges result in a sole 1 with a density suitable for the present invention.

In specific examples, the thermoplastic elastomer may be ethylene-vinyl acetate (EVA).

Additionally or alternatively the sole material may comprise styrene ethylene butylene styrene (SEBS). In particular, the sole material may comprise between 10% and 30% SEBS by weight. Preferably, the sole material may comprise 20% SEBS by weight.

Additionally or alternatively, the sole material may comprise a synthetic rubber. This synthetic rubber may be ethylene propylene diene monomer (EPDM). The sole material may comprise between 10% and 30% of the synthetic rubber by weight. Preferably, the sole material may comprise 20% of the synthetic rubber by weight.

Additionally or alternatively, the sole material may comprise an olefin block. The sole material may comprise between 10% and 30% of the olefin block by weight. Preferably, the sole material may comprise 20% of the olefin block by weight.

The resulting midsole material may have an Asker C hardness in the range of 45 to 65. In preferable embodiments, the resulting midsole material will have an Asker C hardness of 55.

The sole material is placed inside the shaped mould, and is heated up to form a sole 1 with the features as described above.

The invention claimed is:

1. An item of footwear comprising:
   a securing means for securing the item of footwear to a foot of a user; and
   a sole for engaging the foot of the user in use, the sole having a heel region for supporting a heel of the user in use and a forward region for supporting a forefoot of the user in use,
wherein:
   the sole has an integral raised protrusion forming an upper surface in a first portion of the heel region;
   the raised protrusion is surrounded by an integral annular protrusion;
   the sole has first and second lateral edges;
   in the forward region:
      a thickness of the sole along the first and second lateral edges tapers so as to reduce in a forward longitudinal direction; and
      between the tapering first and second lateral edges, the sole comprises a first central region in which a thickness of the sole is maintained or increased in the forward longitudinal direction as the first and second lateral edges taper so as to reduce in the forward longitudinal direction, wherein the first central region is configured to be vertically beneath a ball of the user's foot in use; and
   in a forwardmost tip portion the thickness of the sole along the first and second lateral edges does not taper in the forward longitudinal direction.

2. The item of footwear of claim 1, wherein the raised protrusion is substantially rounded.

3. The item of footwear of claim 1, wherein the raised protrusion has a width in the range 35 mm to 45 mm.

4. The item of footwear of claim 1, wherein the annular protrusion has an outer diameter in the range 10 mm to 20 mm.

5. The item of footwear of claim 1, wherein the raised protrusion has a greater height than the annular protrusion.

6. The item of footwear of claim 1, wherein the raised protrusion has a height in the range 2 mm to 5 mm.

7. The item of footwear according to claim 1, wherein the sole is formed from a midsole material that comprises a thermoplastic elastomer wherein the thermoplastic elastomer is selected from the group consisting of a synthetic rubber, and an olefin block copolymer, wherein the midsole material has an expansion rate of from 1.55 to 1.65.

8. The item of footwear of claim 2, wherein the raised protrusion is dome-shaped.

9. The item of footwear of claim 1, wherein the forwardmost tip portion is a forwardmost 10% of the sole.

10. A method of manufacturing a sole for an item of footwear, the method comprising:
   providing a midsole material comprising a thermoplastic elastomer;
   placing the midsole material in a mould; and
   heating the midsole material so that it expands to fill the mould,
wherein:
   the midsole material has an expansion ratio of from 1.55 to 1.7;

wherein the sole has an integral raised protrusion forming an upper surface in a first portion of a heel region;
- wherein the raised protrusion is surrounded by an integral annular protrusion;
- the sole has first and second lateral edges;
- in the forward region:
  - a thickness of the sole along the first and second lateral edges tapers so as to reduce in a forward longitudinal direction; and
  - between the first and second lateral edges, the sole comprises a first central region in which a thickness of the sole is maintained or increased in the forward longitudinal direction as the first and second lateral edges taper so as to reduce in the forward longitudinal direction, wherein the first central region is configured to be vertically beneath a ball of the user's foot in use; and
- in a forwardmost tip portion the thickness of the sole along the first and second lateral edges does not taper in the forward longitudinal direction.

11. The method of claim 10, wherein the thermoplastic elastomer is ethylene-vinyl acetate (EVA).

12. The method of claim 10, wherein the midsole material comprises styrene ethylene butylene styrene (SEBS).

13. The method of claim 10, wherein the midsole material comprises between 10% and 30% SEBS by weight.

14. The method of claim 10, wherein the midsole material comprises a synthetic rubber.

15. The method of claim 14, wherein the synthetic rubber is ethylene propylene diene monomer (EPDM).

16. The method of claim 14, wherein the midsole material comprises between 10% and 30% of the synthetic rubber by weight.

17. The method of claim 10, wherein the midsole material comprises an olefin block copolymer.

18. The method of claim 10, wherein the midsole material comprises between 10% and 30% of the olefin block copolymer by weight.

19. An item of footwear comprising:
- a securing means for securing the item of footwear to a foot of a user; and
- a sole for engaging the foot of the user in use, the sole being manufactured according to claim 10.

* * * * *